United States Patent
Iwata et al.

[11] 3,890,538
[45] June 17, 1975

[54] PHOTOGRAPHIC ELECTRONIC FLASH APPARATUS

[75] Inventors: Hiroshi Iwata; Yasunori Sawada, both of Osaka; Tetsuo Yamaoka, Settsu, all of Japan

[73] Assignee: West Electric Company, Ltd., Osaka, Japan

[22] Filed: Dec. 26, 1973

[21] Appl. No.: 427,729

[30] Foreign Application Priority Data
Dec. 28, 1972   Japan.................................. 47-3450

[52] U.S. Cl............ 315/241 P; 315/234; 315/240; 354/145
[51] Int. Cl. ........................................ H05b 41/32
[58] Field of Search........ 315/234, 239, 240, 241 R, 315/241 P, 241 S; 354/135, 139, 145, 147, 149; 307/150, 157

[56] References Cited
UNITED STATES PATENTS

| | | | |
|---|---|---|---|
| 2,969,721 | 1/1961 | Casselman et al................. | 354/145 |
| 3,060,796 | 10/1962 | Muse, Jr. ........................ | 354/145 X |
| 3,541,393 | 11/1970 | Diswood........................... | 320/1 |
| 3,555,394 | 1/1971 | Bramer et al................... | 307/157 X |

FOREIGN PATENTS OR APPLICATIONS
1,050,909   2/1959   Germany........................ 315/241 P

*Primary Examiner*—R. V. Rolinec
*Assistant Examiner*—E. R. LaRoche
*Attorney, Agent, or Firm*—Stevens, Davis, Miller & Mosher

[57] ABSTRACT

The present invention relates to a photographic electronic flash apparatus which is used as an auxiliary light source for taking photographs. In general, as long as flash mode photographing is made using a photographic flash apparatus, that is, the photographic flash apparatus is electrically connected with a photographic camera, a main discharge capacitor included in the photographic flash apparatus has charged energy remained therein even when the photographic flash apparatus is not required and, therefore, the photographic flash apparatus is then inconveniently lighted by pushing a shutter button of the photographic camera. There is provided, in accordance with the present invention, a switching circuit which, in order to prevent the photographic flash apparatus from being inconveniently lighted, makes a trigger circuit for the flash discharge tube of the photographic flash apparatus inoperative by turning off a source switch of the photographic flash apparatus.

6 Claims, 2 Drawing Figures

PHOTOGRAPHIC ELECTRONIC FLASH APPARATUS

The present invention relates to a photographic electronic flash apparatus which is used as an auxiliary light source for taking photographs, and an object of the present invention is to prevent the flash discharge tube of the photographic flash apparatus from being inconveniently lighted in the case of the flash apparatus being not required.

Ordinarily, a photographic flash apparatus is required when the brightness of an object to be photographed is as low as requiring an auxiliary light source. That is, when a source switch of the photographic flash apparatus is turned on and thereby a main discharge capacitor of the photographic flash apparatus is charged to a level capable of providing a predetermined amount of light, a neon tube is turned on indicating that firing is ready or, in detail, it is possible by synchronizing and firing the photographic flash apparatus to photograph the object of low brightness.

When the brightness of the object to be photographed is varied not to require the photographic flash apparatus as an auxiliary light source, the source switch is turned off so that the photographic flash apparatus can not be actuated. However, when a shutter button of a photographic camera is pushed immediately after the source switch being turned off, it may occur that a considerable amount of energy is remaining in the main discharge capacitor while the photographic flash apparatus is connected with the photographic camera, the photographic flash apparatus is synchronized to be fired by pushing the shutter button and, as a result, an excessive amount of light from the photographic flash apparatus is added to a suitable amount of natural light, thus disadvantageously resulting in over-exposure.

In accordance with the present invention, the above-mentioned disadvantage is evaded and there is provided a photographic electronic flash apparatus comprising a lighting-preventing circuit by which, when a source switch of a transistor-converter circuit is turned off, the photographic flash apparatus can not be lighted even if a shutter button of a photographic camera is pushed.

That is, in accordance with the present invention, the above-mentioned inconvenient lighting as occurs in a photographic flash apparatus of the prior art can be completely prevented because of the constitution in which, when flash mode photographing is not required, any high voltage sufficient for lighting a flash discharge tube is not produced even if some energy is remaining in a main discharge capacitor.

The above and other features and advantages of the present invention will be apparent from the following detailed description taken in conjunction with the accompanying drawings, in which.

Figure 1:
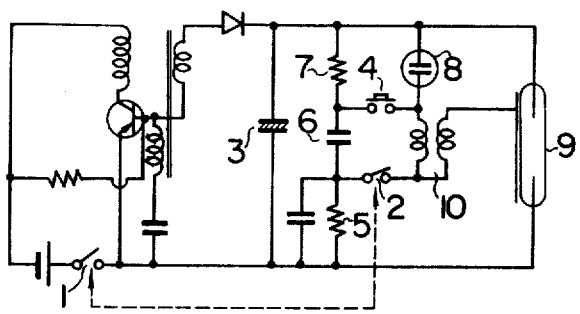
FIG. 1 is a circuit diagram of an embodiment of the present invention.

In FIG. 1, numeral 1 is a source switch for a transistor-converter circuit comprising a low-voltage source, a transistor and a transformer, 2 is a switch which is operatively associated with the source switch 1, that is, turned off as the source switch 1 is turned off and turned on as the source switch 1 is turned on.

Numeral 3 is a main discharge capacitor which supplies a flash discharge tube 9 with lighting energy, 4 is a trigger switch for lighting, 5 and 7 are charging resistors for charging a trigger capacitor 6, 8 is a neon tube for indicating the charged voltage of the main discharge capacitor 3, and 10 is a trigger coil for generating high voltage to be applied to the trigger electrode of the flash discharge tube 9.

Now, the operation of the photographic flash apparatus as shown in FIG. 1 will be described.

When the source switch is turned on, the main discharge capacitor 3 is charged while the trigger capacitor 6 is also charged through the resistors 5 and 7. When the main discharge capacitor 3 is charged to a predetermined voltage value causing the switch 4 to be turned on, the charged energy of the trigger capacitor 6 is discharged through the switch 4, the primary side of the trigger coil 10 and the switch 2 being turned on causing the secondary side of the trigger coil 10 to apply high voltage to the trigger electrode of the flash discharge tube 9, as a result, the flash discharge tube 9 is lighted by consuming the charged energy in the main discharge capacitor 3. When the source switch 1 remains turned on after lighting, the main charging capacitor 3 and the trigger capacitor 6 are likewise charged. However, if the source switch is turned off, as is reasonable when, for example, the brightness of the object is varied and any auxiliary light source is not required, the switch 2 is also turned off and, as a result, even if the trigger switch 4 is turned on, the charged energy in the trigger capacitor 6 is not discharged on the primary side of the trigger coil 10 and, consequently, any high voltage is not produced on the secondary side of the trigger coil 10 causing the flash discharge tube 9 not to be lighted.

The neon tube 8 for indicating the charged energy in the main discharge capacitor 3 is, when the source switch 1 and the switch 2 are turned on, supplied with current through the trigger coil 10, the switch 2 and the resistor 5, that is, indicates that the main discharge capacitor 3 is at a predetermined voltage level. On the other hand, when the source switch 1 is turned off, the switch 2 is also turned off and the neon tube circuit is opened, as a result, the neon tube 8 is not lighted indicating that the photographic flash apparatus does not operate.

Though, in this embodiment, a neon tube is used, any other display element such as photo-diode or electroluminescent element may be employed for performing the same action.

Figure 2:
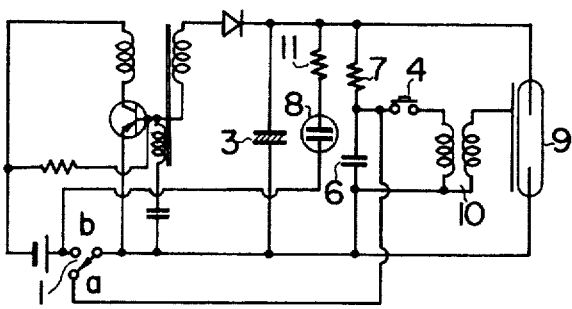
FIG. 2 is a circuit diagram of another embodiment of the present invention.

FIG. 2 shows another embodiment of the present invention in which the source switch 1 has two contacts. When the source switch 1 is connected on the b side, the source circuit is connected causing this embodiment to be operable. That is, then, the main discharge capacitor 3 and the trigger capacitor 6 are charged causing the trigger circuit to be actuated as mentioned in the preceding embodiment and, finally, the flash discharge tube 9 is lighted by the trigger switch 4 being short-circuited. On the other hand, when the source switch 1 is connected on the a side, the trigger capacitor 6 is short-circuited and does not produce any charged energy. Consequently, even if the trigger switch 4 is short-circuited, any high-voltage is not produced on the secondary side of the trigger coil 10 and the flash discharge tube 9 can not be lighted while, at the same time, the neon tube 8 is not lighted, because the neon tube 8 is disconnected from the main discharge capacitor 3, indicating that the photographic flash apparatus does not work.

The feature of the embodiment as shown in Fig. 2 consists in that, since any other switch than the trigger switch 4 is not connected with the circuit having the trigger capacitor 6 and the primary side of trigger coil 10 connected in parallel, the influence of the contact resistance with other switches or of the internal resistance in long wires to other switches, the loss due to in the higher components in the trigger damping oscillation frequencies, or the like are completely and advantageously prevented.

What we claim is:

1. A photographic flash apparatus comprising: a D.C. to A.C. converter circuit having a low-voltage power supply coupled to a transformer primary through a transistor and a first switching means, for generating a high voltage A.C. signal in an output winding of said transformer;

rectifying means connected to the output winding of said transformer for converting the high voltage A.C. signal into a high voltage D.C. signal;

a main discharge capacitor connected to said rectifying means and being charged from the high D.C. voltage;

a flash discharge tube having anode and cathode electrodes connected to said main discharge capacitor and also having a trigger electrode;

a trigger circuit including a resistor, a trigger capacitor coupled to said resistor, a trigger switch and a trigger transformer coupled to each other and to said resistor and trigger capacitor, said trigger transformer including an output winding connected to said trigger electrode of said flash discharge tube; and a second switching means electrically coupled to said trigger circuit and coupled with said first switching means of said converter circuit, said second switching means rendering said trigger circuit operative to trigger said flash discharge tube when said first switching means is in an on state and rendering said trigger circuit inoperative to prevent it from triggering said tube when said first switching means is in an off state.

2. A photographic flash apparatus according to claim 1, wherein said second switching means comprises a control switch inserted in a discharge circuit of said trigger capacitor including a primary winding of said trigger transformer, said control switch closing and opening said discharge circuit operatively in association with the on and off states, respectively, of said first switching means.

3. A photographic flash apparatus according to claim 1, wherein said second switching means comprises a control switch inserted in a short-circuiting path which is connected in parallel with said trigger capacitor of said trigger circuit, said control switch closing and opening said short-circuiting path operatively in association with the off and on states, respectively, of said first switching means.

4. A photographic flash apparatus according to claim 3, wherein said first switching means and second switching means are incorporated into one switch circuit having two contacts, one of which comprises said first switching means in said converter circuit and the other of which comprises said second switching means.

5. A photographic flash apparatus according to claim 1, further comprising display means connected in parallel with said main discharge capacitor through said said second switching means for displaying the operativeness of said trigger circuit and the charged voltage of said main discharge capacitor.

6. A photographic flash apparatus according to claim 5, wherein said display means comprises a neon tube which is turned on and off in response to the closing and opening, respectively, of said second switching means.

* * * * *